United States Patent
Lin et al.

(10) Patent No.: US 9,923,507 B2
(45) Date of Patent: Mar. 20, 2018

(54) POSITION-SENSORLESS CONTROL METHOD AND APPARATUS FOR BRUSHLESS MOTOR

(71) Applicant: Shanghai Bright Power Semiconductor Co., Ltd., Shanghai (CN)

(72) Inventors: Jianhui Lin, Tianjin (CN); Weixin Zhang, Tianjin (CN)

(73) Assignee: SHANGHAI BRIGHT POWER SEMICONDUCTOR CO., LTD., Shanghai (CN)

(*) Notice: Subject to any disclaimer, the term of this patent is extended or adjusted under 35 U.S.C. 154(b) by 86 days.

(21) Appl. No.: 14/911,568

(22) PCT Filed: Aug. 26, 2015

(86) PCT No.: PCT/CN2015/088145
§ 371 (c)(1),
(2) Date: Feb. 11, 2016

(87) PCT Pub. No.: WO2017/020375
PCT Pub. Date: Feb. 9, 2017

(65) Prior Publication Data
US 2017/0163205 A1  Jun. 8, 2017

(30) Foreign Application Priority Data
Aug. 6, 2015 (CN) .......................... 2015 1 0478863
Aug. 6, 2015 (CN) ...................... 2015 2 0588367 U (51) Int. Cl.
H02P 23/00 (2016.01)
H02P 31/00 (2006.01)

(52) U.S. Cl.
CPC .................................. *H02P 31/00* (2013.01)

(58) Field of Classification Search
CPC .................................. H02P 6/182; H02P 6/24
See application file for complete search history.

(56) References Cited

U.S. PATENT DOCUMENTS

2010/0302700 A1* 12/2010 Kellis .................. H02H 3/0935
361/109
2012/0256575 A1* 10/2012 Chien ...................... H02P 6/24
318/400.35

* cited by examiner

*Primary Examiner* — Karen Masih
(74) *Attorney, Agent, or Firm* — Buchanan Ingersoll & Rooney PC (57) ABSTRACT

The present invention discloses a position-sensorless control method for a brushless motor, the method including: turning off a first driving voltage of a first phase coil, and within detection time, detecting a back electromotive force of the first phase coil; determining a reference phase and a cycle of a second driving voltage according to the back electromotive force; determining a pulse width modulation signal according to the reference phase and the cycle; and determining to provide the second driving voltage for the brushless motor according to the pulse width modulation signal, the second driving voltage being used to drive the brushless motor. The present invention effectively reduces the cost, decreases implementation difficulty and increases system performance and reliability.

8 Claims, 7 Drawing Sheets

POSITION-SENSORLESS CONTROL METHOD AND APPARATUS FOR BRUSHLESS MOTOR

BACKGROUND

Technical Field

The present invention relates to the field of motor control, and particularly to a position-sensorless control method and apparatus for a brushless motor.

Related Art

A brushless motor replaces mechanical commutation with electronic commutation, overcomes a series of problems produced by the traditional DC motor due to brush friction, and has advantages such as good speed control performance, small volume and high efficiency, and thus is widely applied to various fields of production of national economy and people's daily life.

The brushless motor generally uses one or more position sensors to detect a position of a motor rotor, and accordingly applies driving voltages to respective phase coils of the motor, to drive the motor to rotate. Problems such as installation space, installation error and high temperature failure brought about by the position sensors restrict applications of position sensor schemes in fields such as range hoods, and increase the system cost. Through parameter detection such as phase currents and voltages and position-sensorless algorithms such as sliding mode and state observer, position-sensorless motor control can be achieved, but such algorithms have high requirements for software and hardware of a control apparatus, are more sensitive to motor parameters, and generally have a higher cost.

SUMMARY

An objective of the present invention is to provide a method and apparatus that achieve position-sensorless sinusoidal wave control through back electromotive force detection (BEMF), so as to solve the deficiencies existing in the prior art.

To achieve the objective, in a first aspect, the present invention provides a position-sensorless control method for a brushless motor, the method including:

turning off a first driving voltage of a first phase coil, and within detection time, detecting a back electromotive force of the first phase coil;

determining a reference phase and a cycle of a second driving voltage according to the back electromotive force;

determining a pulse width modulation (PWM) signal according to the reference phase and the cycle; and determining to provide the second driving voltage for the brushless motor according to the pulse width modulation signal, the second driving voltage being used to drive the brushless motor.

Preferably, the detection time includes: blanking time and back electromotive force detection time;

the blanking time is time required by decreasing a phase current of the first phase coil to zero after the first driving voltage is turned off; and the back electromotive force detection time is time required by detecting the back electromotive force of the first phase coil after the phase current of the first phase coil is decreased to zero.

Preferably, the determining a reference phase and a cycle of a second driving voltage according to the back electromotive force includes:

when zero crossing of the back electromotive force occurs within the back electromotive force detection time, taking a zero-crossing time of the back electromotive force as the reference phase of the second driving voltage, and keeping the cycle of the second driving voltage unchanged; or when zero crossing of the back electromotive force occurs before detection of the back electromotive force, taking a time when it is found that zero crossing of the back electromotive force has occurred as the reference phase, and decreasing the cycle of the second driving voltage; or when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

Preferably, the determining a pulse width modulation signal according to the reference phase and the cycle includes:

generating a control signal of a duty cycle of the pulse width modulation signal;

generating a sinusoidal wave modulated function according to a sinusoidal wave modulation algorithm and the control signal of the duty cycle;

generating a triangular carrier with a fixed frequency;

modulating the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal; and adjusting the phase of the first pulse width modulation signal, and outputting a second pulse width modulation signal.

Preferably, the zero crossing of the back electromotive force includes zero crossing of the back electromotive force changed from positive to negative and/or zero crossing changed from negative to positive.

In a second aspect, the present invention provides a position-sensorless control apparatus for a brushless motor, the apparatus including:

a detection unit, used to turn off a first driving voltage of a first phase coil, and within detection time, detect a back electromotive force of the first phase coil;

a determination unit, used to determine a reference phase and a cycle of a second driving voltage according to the back electromotive force;

a control unit, used to determine a pulse width modulation signal according to the reference phase and the cycle; and a drive unit, used to determine to provide the second driving voltage for the brushless motor according to the pulse width modulation signal, the second driving voltage being used to drive the brushless motor.

Preferably, the detection time includes: blanking time and back electromotive force detection time;

the blanking time is time required by decreasing a phase current of the first phase coil to zero after the first driving voltage is turned off; and the back electromotive force detection time is time required by detecting the back electromotive force of the first phase coil after the phase current of the first phase coil is decreased to zero.

Preferably, the, a determination unit, used to determine a reference phase and a cycle of a second driving voltage according to the back electromotive force, includes:

when zero crossing of the back electromotive force occurs within the back electromotive force detection time, taking a zero-crossing time of the back electromotive force as the reference phase of the second driving voltage, and keeping the cycle of the second driving voltage unchanged; or when zero crossing of the back electromotive force occurs before detection of the back electromotive force, taking a time when it is found that zero crossing of the back electromotive force has occurred as the reference phase, and decreasing the cycle of the second driving voltage; or when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

Preferably, the control unit includes:

a duty cycle control unit, used to generate a control signal of a duty cycle of the pulse width modulation signal;

a modulated function generation unit, used to generate a sinusoidal wave modulated function according to a sinusoidal wave modulation algorithm and the control signal of the duty cycle;

a triangular carrier generation unit, used to generate a triangular carrier with a fixed frequency;

a pulse width modulation signal generation unit, used to modulate the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal; and a phase adjustment unit, used to adjust the phase of the first pulse width modulation signal, and output a second pulse width modulation signal.

Preferably, the zero crossing of the back electromotive force includes zero crossing of the back electromotive force changed from positive to negative and/or zero crossing changed from negative to positive.

The present invention, through back electromotive force detection, determines a reference phase and a cycle within which driving voltages are applied to phase coils of the motor next time according to a result of the back electromotive force detection, so as to achieve position-sensorless sinusoidal wave control. The present invention effectively reduces the cost, decreases implementation difficulty and increases system performance and reliability.

DETAILED DESCRIPTION

To express the technical solution and advantages of the embodiments of the present invention more clearly, the technical solution of the present invention is further described below in detail with reference to the accompanying drawings and embodiments.

Figure 1:
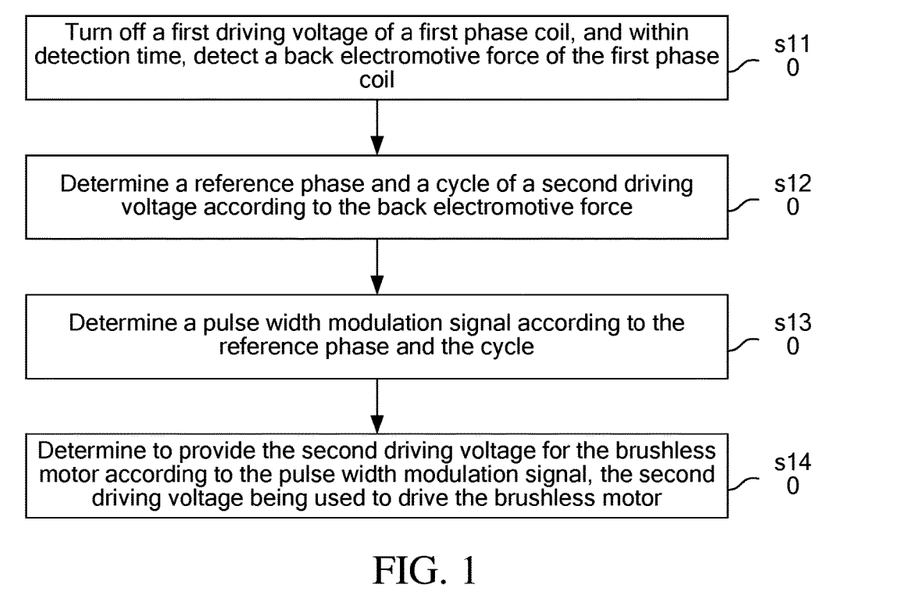
FIG. 1 is a flowchart of a position-sensorless control method for a brushless motor according to an embodiment of the present invention.

FIG. 1 is a flowchart of a position-sensorless control method for a brushless motor 10 according to an embodiment of the present invention, as shown in FIG. 1, the method including:

Step 110. Turn off a first driving voltage of a first phase coil 12, and within detection time, detect a back electromotive force of the first phase coil.

Further, when a phase current of the first phase coil is decreased to zero, detection of the back electromotive force of the first phase coil begins.

Step 120. Determine a reference phase and a cycle of a second driving voltage according to the back electromotive force.

Step 130. Determine a pulse width modulation signal according to the reference phase and the cycle.

Step 140. Determine to provide the second driving voltage for the brushless motor according to the pulse width modulation signal, the second driving voltage being used to drive the brushless motor.

Specifically, the detection time includes: blanking time and back electromotive force detection time;

the blanking time is time required by decreasing a phase current of the first phase coil to zero after the first driving voltage is turned off; and the back electromotive force detection time is time required by detecting the back electromotive force of the first phase coil after the phase current of the first phase coil is decreased to zero.

It should be noted that the blanking time is controlled by motor parameters and a phase current value of the first phase coil.

Specifically, in step 120, the determining a reference phase and a cycle of a second driving voltage according to the back electromotive force includes:

when zero crossing of the back electromotive force occurs within the back electromotive force detection time, taking a zero-crossing time of the back electromotive force as the reference phase of the second driving voltage, and keeping the cycle of the second driving voltage unchanged; or when zero crossing of the back electromotive force occurs before detection of the back electromotive force, taking a time when it is found that zero crossing of the back electromotive force has occurred as the reference phase, and decreasing the cycle of the second driving voltage; or when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

Specifically, the zero crossing of the back electromotive force includes zero crossing of the back electromotive force changed from positive to negative and/or zero crossing changed from negative to positive.

Figure 2:
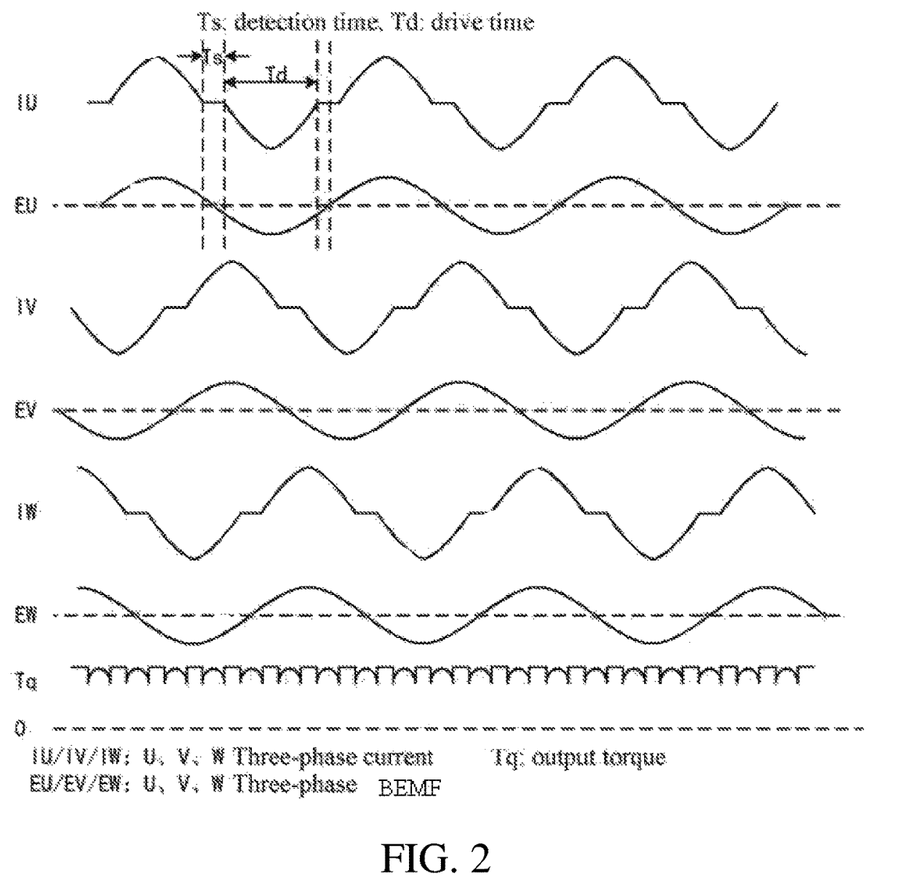
FIG. 2 is a schematic diagram of a back electromotive force, a phase current and a phase of one position-sensorless control method for a brushless motor according to an embodiment of the present invention.
Figure 3:
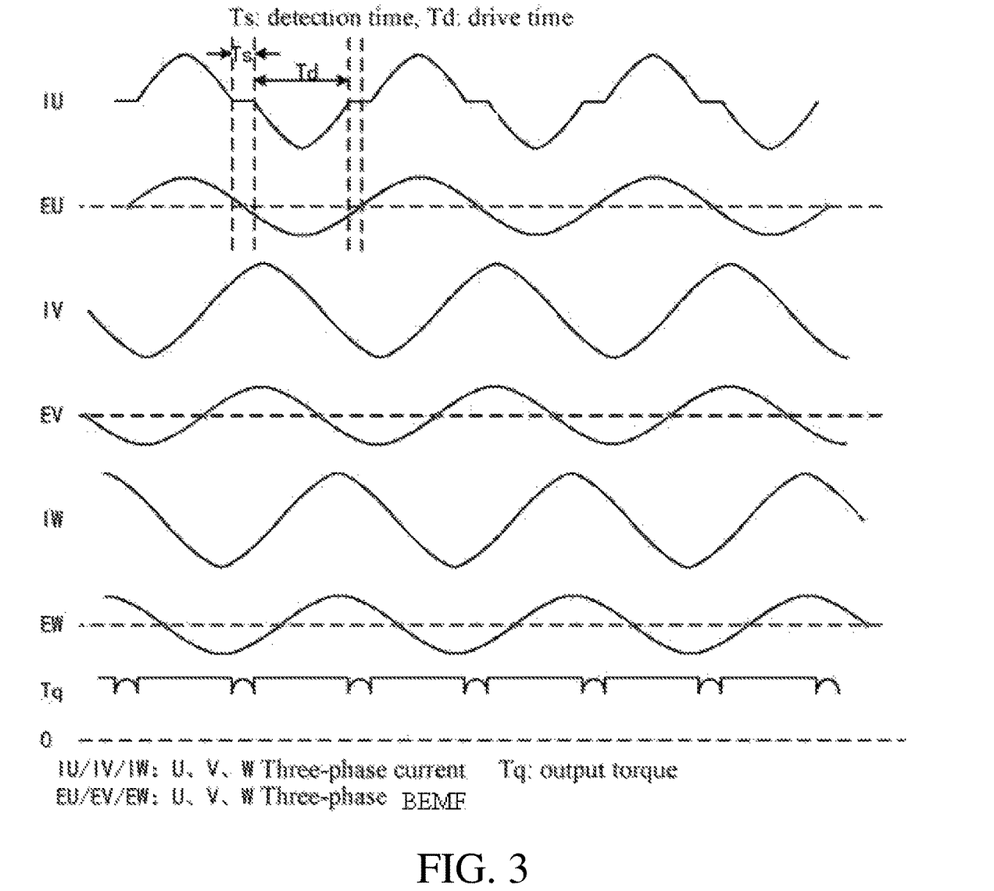
FIG. 3 is a schematic diagram of a back electromotive force, a phase current and a phase of another position-sensorless control method for a brushless motor according to an embodiment of the present invention.

It should be noted that, by taking a three-phase brushless motor as an example, as shown in FIG. 2, within a cycle of any phase current, detection time Ts is set when the current is changed from positive to negative and changed from negative to positive, that is, there are two back electromotive force detection time; when phase currents in three phases are combined together, there are a total of six back electromotive force detection time within a 360° electric angle cycle, and an interval between any two detection time Ts is about a 60° electric angle cycle. Within the detection time Ts, one phase of the phase currents in three phases is gradually decreased to zero due to shutdown of the driving voltage, that is, it does not provide output torque, and thus torque Tq provided by a three-phase coil will have some fluctuations. When the detection time Ts accounts for a small time portion, torque fluctuations caused by the detection time Ts are very small actually. Moreover, it is unnecessary to use all six back electromotive force zero-crossing points within the 360° electric angle cycle, and back electromotive force detection actually can only be carried out for a certain phase coil. As shown in FIG. 3, the back electromotive force detection is only carried out for a U-phase coil. Furthermore, it is feasible to only set one detection time Ts on a phase current changed from positive to negative or changed from negative to positive on the basis of FIG. 3, that is, one reference phase is acquired only through back electromotive force zero-crossing detection within the 360° electric angle cycle, and a 360° electric angle cycle within which driving voltages are applied to respective phase coils of the motor next time is adjusted according to a detection result.

Figure 4:
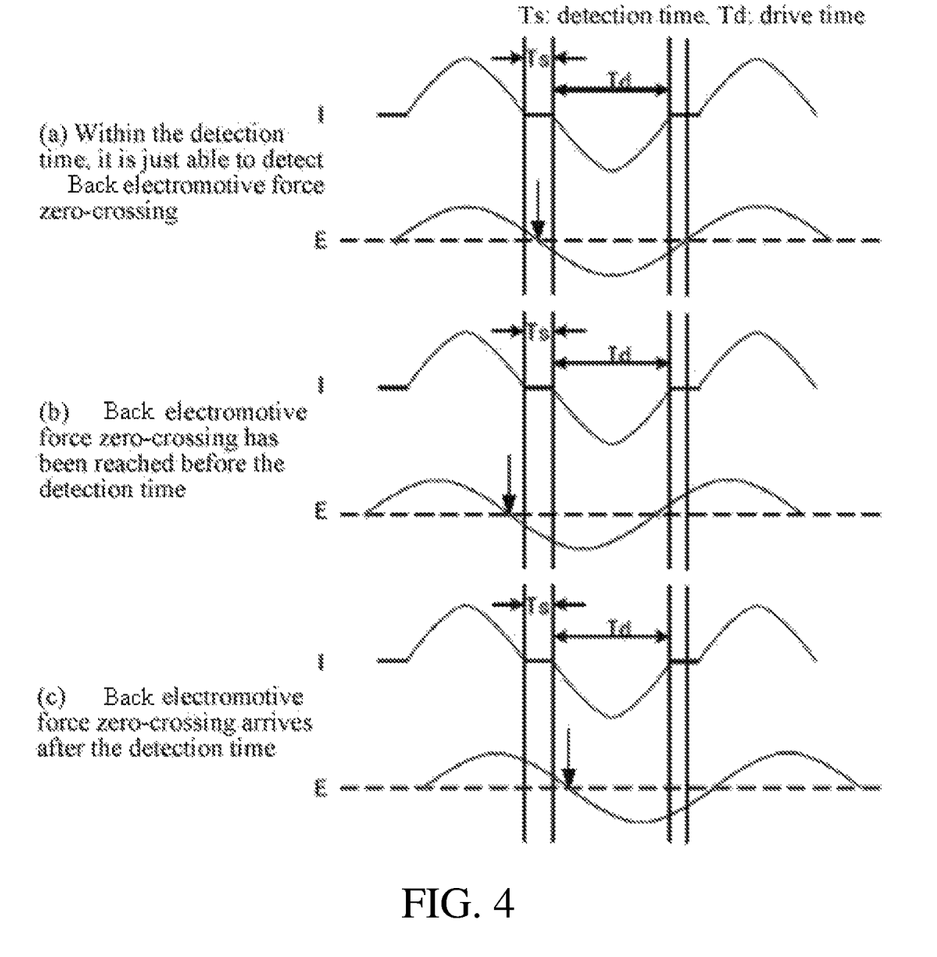
FIG. 4 is a schematic diagram of a relationship between back electromotive force detection time and a zero-crossing point of a brushless motor according to an embodiment of the present invention.

Within the 360° electric angle cycle, whether one or six or other number of back electromotive force detection time is set, the relationship between the set detection time Ts and the back electromotive force zero-crossing falls within the three situations shown in FIG. 4.

(a) Within the set detection time Ts, it is just able to detect back electromotive force zero-crossing, which indicates that the cycle used by previous application of the driving voltage is appropriate, and thus zero-crossing time of the back electromotive force is taken as the reference phase, and a cycle within which driving voltages are applied to respective phase coils next time is kept unchanged.

(b) After the back electromotive force detection time begins, when it is found that back electromotive force zero-crossing has occurred before the detection begins, the time is taken as the reference phase, and the cycle within which driving voltages are applied to respective phase coils next time is decreased.

(c) If back electromotive force zero-crossing does not occur before the detection begins and has not been detected all the time within the back electromotive force detection time, the back electromotive force detection time is extended until back electromotive force zero-crossing is detected, zero-crossing time of the back electromotive force is taken as the reference phase, and the cycle within which driving voltages are applied to respective phase coils next time is increased.

Figure 5:
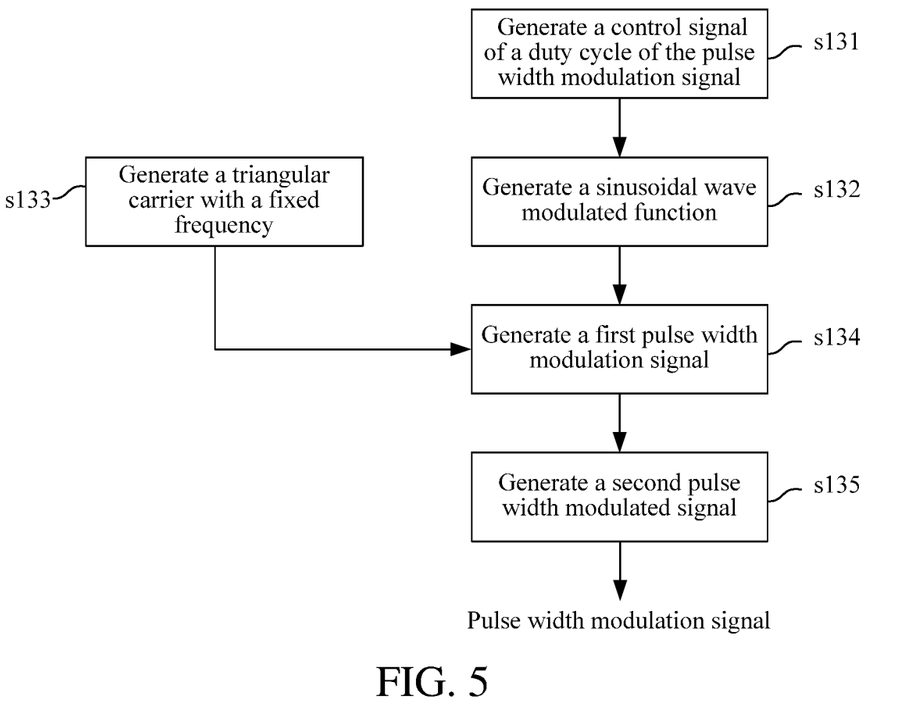
FIG. 5 is a flowchart of a method for determining a pulse width modulation signal according to an embodiment of the present invention.

Specifically, as shown in FIG. 5, in step 130, the determining a pulse width modulation signal according to the reference phase and the cycle includes:

Step 131. Generate a control signal of a duty cycle of the pulse width modulation signal.

Optionally, in the embodiment of the present invention, a duty cycle control unit 731 decides a duty cycle of the pulse width modulation signal by controlling amplitude of the modulated function.

Step 132. Generate a sinusoidal wave modulated function according to a sinusoidal wave modulation algorithm and the control signal of the duty cycle.

Step 133. Generate a triangular carrier with a fixed frequency.

Step 134. Modulate the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal.

Optionally, in the embodiment of the present invention, a regular sampling rule is adopted to sample and compare a triangular carrier and a modulate function, so as to acquire the corresponding pulse width modulation signal.

Step 135. Adjust the phase of the first pulse width modulation signal, and output a second pulse width modulation signal.

Optionally, due to inductance properties of the motor coil, a phase current of the coil will lag behind an applied driving voltage, and thus when the driving voltage is applied, it is common to advance it a certain advance angle on the basis of the reference phase, to increase output torque and efficiency.

The embodiment of the present invention, through back electromotive force detection, determines a reference phase and a cycle within which driving voltages are applied to respective phase coils of the motor next time according to a result of the back electromotive force detection, so as to achieve position-sensorless sinusoidal wave control. The present invention effectively reduces the cost, decreases implementation difficulty and increases system performance and reliability.

Figure 6:
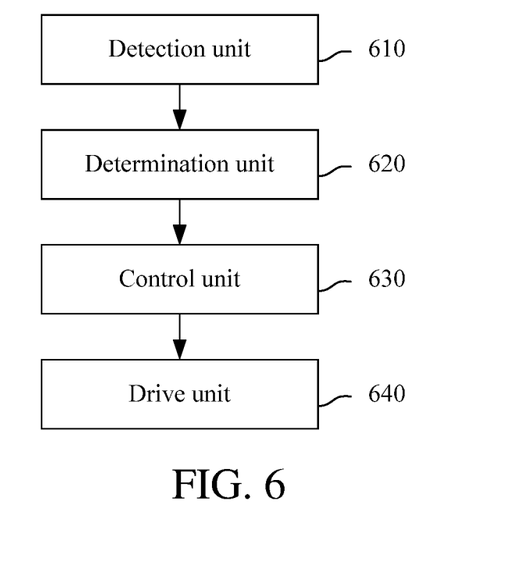
FIG. 6 is a structural block diagram of a position-sensorless control apparatus for a brushless motor according to an embodiment of the present invention.

In a second aspect, FIG. 6 is a structural block diagram of a position-sensorless control apparatus for a brushless motor according to an embodiment of the present invention, as shown in FIG. 6, the apparatus including:

a detection unit 610, used to turn off a first driving voltage of a first phase coil, and within detection time, detect a back electromotive force of the first phase coil;

a determination unit 620, used to determine a reference phase and a cycle of a second driving voltage according to the back electromotive force;

a control unit 630, used to determine a pulse width modulation signal according to the reference phase and the cycle; and a drive unit 640, used to determine to provide the second driving voltage for the brushless motor according to the pulse width modulation signal, the second driving voltage being used to drive the brushless motor.

Specifically, the detection time includes: blanking time and back electromotive force detection time;

the blanking time is time required by decreasing a phase current of the first phase coil to zero after the first driving voltage is turned off; and the back electromotive force detection time is time required by detecting the back electromotive force of the first phase coil after the phase current of the first phase coil is decreased to zero.

It should be noted that, the blanking time is controlled by motor parameters and a phase current value of the first phase coil.

Specifically, the determination unit 620, used to determine a reference phase and a cycle of a second driving voltage according to the back electromotive force, includes:

when zero crossing of the back electromotive force occurs within the back electromotive force detection time, taking a zero-crossing time of the back electromotive force as the reference phase of the second driving voltage, and keeping the cycle of the second driving voltage unchanged; or when zero crossing of the back electromotive force occurs before detection of the back electromotive force, taking a time when it is found that zero crossing of the back electromotive force has occurred as the reference phase, and decreasing the cycle of the second driving voltage; or when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

Specifically, the zero crossing of the back electromotive force includes zero crossing of the back electromotive force changed from positive to negative and/or zero crossing changed from negative to positive.

It should be noted that, by taking a three-phase brushless motor as an example, as shown in FIG. 2, within a cycle of any phase current, detection time Ts is set when the current is changed from positive to negative and changed from negative to positive, that is, there are two back electromotive force detection time; when phase currents in three phases are combined together, there are a total of six back electromotive force detection time within a 360° electric angle cycle, and an interval between any two detection time Ts is about a 60° electric angle cycle. Within the detection time Ts, one phase of the phase currents in three phases is gradually decreased to zero due to shutdown of the driving voltage, that is, it does not provide output torque, and thus torque Tq provided by a three-phase coil will have some fluctuations. When the detection time Ts accounts for a small time portion, torque fluctuations caused by the detection time Ts are very small actually. Moreover, it is unnecessary to use all six back electromotive force zero-crossing points within the 360° electric angle cycle, and back electromotive force detection actually can only be carried out for a certain phase coil. As shown in FIG. 3, the back electromotive force detection is only carried out for a U-phase coil. Furthermore, it is feasible to only set one detection time Ts on a phase current changed from positive to negative or changed from negative to positive on the basis of FIG. 3, that is, one reference phase is acquired only through back electromotive force zero-crossing detection within the 360° electric angle cycle, and a 360° electric angle cycle within which driving voltages are applied to respective phase coils of the motor next time is adjusted according to a detection result.

Within the 360° electric angle cycle, whether one or six or other number of back electromotive force detection time is set, the relationship between the set detection time Ts and the back electromotive force zero-crossing falls within the three situations shown in FIG. 4.

(a) Within the set detection time Ts, it is just able to detect back electromotive force zero-crossing, which indicates that the cycle used by previous application of the driving voltage is appropriate, and thus zero-crossing time of the back electromotive force is taken as the reference phase, and a cycle within which driving voltages are applied to respective phase coils next time is kept unchanged.

(b) After the back electromotive force detection time begins, when it is found that back electromotive force zero-crossing has occurred before the detection begins, the time is taken as the reference phase, and the cycle within which driving voltages are applied to respective phase coils next time is decreased.

(c) If back electromotive force zero-crossing does not occur before the detection begins and has not been detected all the time within the back electromotive force detection time, the back electromotive force detection time is extended until back electromotive force zero-crossing is detected, zero-crossing time of the back electromotive force is taken as the reference phase, and the cycle within which driving voltages are applied to respective phase coils next time is increased.

Figure 7:
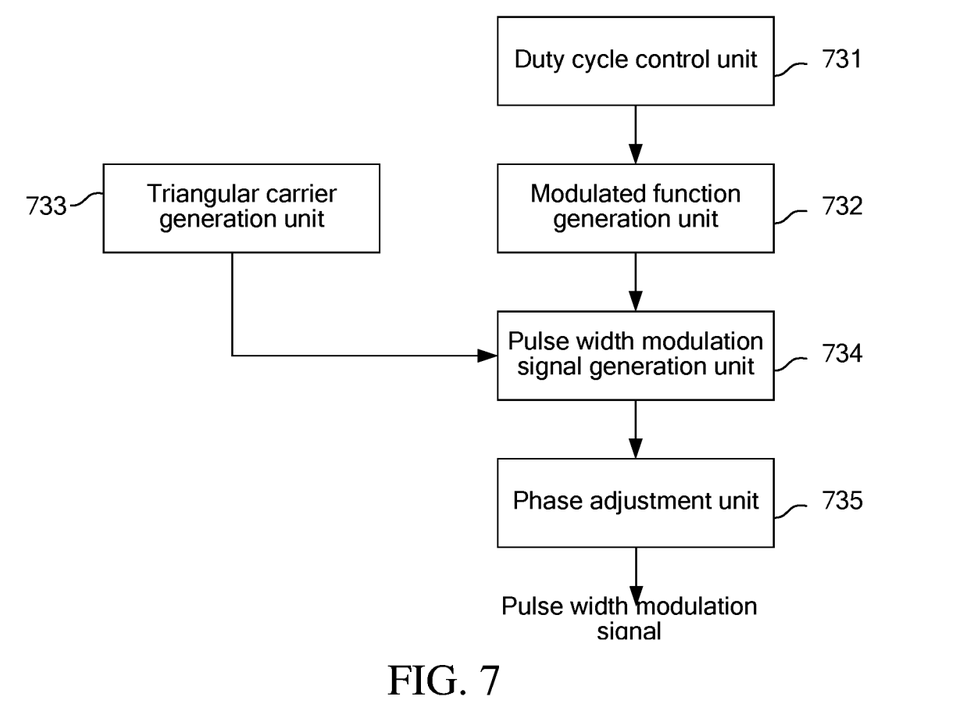
FIG. 7 is a structural block diagram of a sinusoidal wave control unit of a brushless motor according to an embodiment of the present invention.
Figure 8:
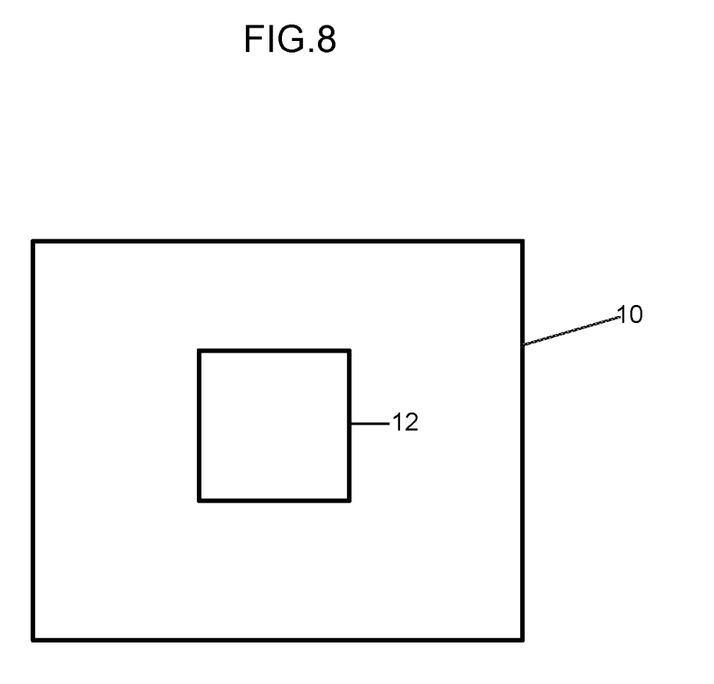
FIG. 8 is a schematic view of the brushless motor with the first phase coil.

Specifically, as shown in FIG. 7, the control unit 630 includes:

A duty cycle control unit 731, used to generate a control signal of a duty cycle of the pulse width modulation signal.

Optionally, in the embodiment of the present invention, the duty cycle control unit 731 decides a duty cycle of the pulse width modulation signal by controlling amplitude of the modulated function.

A modulated function generation unit 732, used to generate a sinusoidal wave modulated function according to a sinusoidal wave modulation algorithm and the control signal of the duty cycle.

A triangular carrier generation unit 733, used to generate a triangular carrier with a fixed frequency.

A pulse width modulation signal generation unit 734, used to modulate the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal.

Optionally, in the embodiment of the present invention, a regular sampling rule is adopted to sample and compare a triangular carrier and a modulate function, so as to acquire the corresponding pulse width modulation signal.

A phase adjustment unit 735, used to adjust the phase of the first pulse width modulation signal, and output a second pulse width modulation signal.

Optionally, due to inductance properties of the motor coil, a phase current of the coil will lag behind an applied driving voltage, and thus when the driving voltage is applied, it is common to advance it a certain advance angle on the basis of the reference phase, to increase output torque and efficiency.

The embodiment of the present invention, through back electromotive force detection, determines a reference phase and a cycle within which driving voltages are applied to respective phase coils of the motor next time according to a result of the back electromotive force detection, so as to achieve position-sensorless sinusoidal wave control. The present invention effectively reduces the cost, decreases implementation difficulty and increases system performance and reliability.

It can be further realized by professionals that, exemplary units and algorithm steps described with reference to the embodiments disclosed herein can be implemented by electronic hardware or a combination of computer software and electronic hardware. To clearly describe interchangeability between hardware and software, compositions and steps of the examples are generally described in the above description according to functions. Whether these functions are executed by hardware or software depends on specific applications and design constraints of the technical solution. A person skilled in the art may use different methods to implement the described functions for each specific application, but such implementation should not be construed as going beyond the scope of the present application.

Method or algorithm steps described in combination with the embodiments disclosed herein can be implemented by hardware, a software module executed by a processor, or a combination thereof. The software module may be placed in a random access memory (RAM), a memory, a read only memory (ROM), an electrically programmable ROM, an electrically erasable programmable ROM, a register, a hard disk, a removable disk, a CD-ROM, or any other forms of storage medium well known in this technical field.

The specific implementation modes described above further describe the objectives, technical solutions and beneficial effects of the present invention in detail, and it should be understood that the above descriptions are merely specific implementation modes of the present invention, but are not used to limit the protection scope of the present invention. Any modification, equivalent replacement, improvement and the like made within the spirit and principle of the present invention should be included in the protection scope of the present invention.

What is claimed is:

1. A position-sensorless control method for a brushless motor, wherein the method comprises:
    turning off a first driving voltage of a first phase coil, and within a detection time, detecting a back electromotive force of the first phase coil;
    determining a reference phase and a cycle of a second driving voltage according to the back electromotive force;
    determining a pulse width modulation signal according to the reference phase and the cycle; and
    determining to provide the second driving voltage for the brushless motor according to the pulse width modulation signal, the second driving voltage being used to drive the brushless motor;
    wherein:
    the detection time comprises: blanking time and back electromotive force detection time;
    the blanking time is time required by decreasing a phase current of the first phase coil to zero after the first driving voltage is turned off; and
    the back electromotive force detection time is time required by detecting the back electromotive force of the first phase coil after the phase current of the first phase coil is decreased to zero.

2. The method according to claim 1, wherein the determining a reference phase and a cycle of a second driving voltage according to the back electromotive force comprises:
    when zero crossing of the back electromotive force occurs within the back electromotive force detection time, taking a zero-crossing time of the back electromotive force as the reference phase of the second driving voltage, and keeping the cycle of the second driving voltage unchanged; or
    when zero crossing of the back electromotive force occurs before detection of the back electromotive force, taking a time when it is found that zero crossing of the back electromotive force has occurred as the reference phase, and decreasing the cycle of the second driving voltage; or
    when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

3. The method according to claim 1, wherein the determining a pulse width modulation signal according to the reference phase and the cycle comprises:
    generating a control signal of a duty cycle of the pulse width modulation signal;
    generating a sinusoidal wave modulated function according to a sinusoidal wave modulation algorithm and the control signal of the duty cycle;
    generating a triangular carrier with a fixed frequency;
    modulating the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal; and
    adjusting the phase of the first pulse width modulation signal, and outputting a second pulse width modulation signal.

4. The method according to claim 2, wherein the zero crossing of the back electromotive force comprises zero crossing of the back electromotive force changed from positive to negative and/or zero crossing changed from negative to positive.

5. A position-sensorless control apparatus for a brushless motor, wherein the apparatus comprises:
    a detection unit, used to turn off a first driving voltage of a first phase coil, and within detection time, detect a back electromotive force of the first phase coil;
    a determination unit, used to determine a reference phase and a cycle of a second driving voltage according to the back electromotive force;
    a control unit, used to determine a pulse width modulation signal according to the reference phase and the cycle; and
    a drive unit, used to determine to provide the second driving voltage for the brushless motor according to the pulse width modulation signal, the second driving voltage being used to drive the brushless motor;
    wherein:
    the detection time comprises: blanking time and back electromotive force detection time;
    the blanking time is time required by decreasing a phase current of the first phase coil to zero after the first driving voltage is turned off; and
    the back electromotive force detection time is time required by detecting the back electromotive force of the first phase coil after the phase current of the first phase coil is decreased to zero.

6. The apparatus according to claim 5, wherein the, a determination unit, used to determine a reference phase and a cycle of a second driving voltage according to the back electromotive force, comprises:

when zero crossing of the back electromotive force occurs within the back electromotive force detection time, taking a zero-crossing time of the back electromotive force as the reference phase of the second driving voltage, and keeping the cycle of the second driving voltage unchanged; or when zero crossing of the back electromotive force occurs before detection of the back electromotive force, taking a time when it is found that zero crossing of the back electromotive force has occurred as the reference phase, and decreasing the cycle of the second driving voltage; or when zero crossing of the back electromotive force does not occur both before the back electromotive force detection time and within the back electromotive force detection time, extending the detection time until zero crossing of the back electromotive force is detected, taking the zero-crossing time as the reference phase, and increasing the cycle of the second driving voltage.

7. The apparatus according to claim 5, wherein the control unit comprises:

a duty cycle control unit, used to generate a control signal of a duty cycle of the pulse width modulation signal;

a modulated function generation unit, used to generate a sinusoidal wave modulated function according to a sinusoidal wave modulation algorithm and the control signal of the duty cycle;

a triangular carrier generation unit, used to generate a triangular carrier with a fixed frequency;

a pulse width modulation signal generation unit, used to modulate the sinusoidal wave modulated function by using the triangular carrier to generate a first pulse width modulation signal, the reference phase of the second driving voltage being taken as an initial phase of the first pulse width modulation signal, and the cycle of the second driving voltage being taken as a cycle of the first pulse width modulation signal; and a phase adjustment unit, used to adjust the phase of the first pulse width modulation signal, and output a second pulse width modulation signal.

8. The apparatus according to claim 6, wherein the zero crossing of the back electromotive force comprises zero crossing of the back electromotive force changed from positive to negative and/or zero crossing changed from negative to positive.

* * * * *